(12) United States Patent
Nowak et al.

(10) Patent No.: US 7,410,520 B2
(45) Date of Patent: Aug. 12, 2008

(54) FOLDABLE FILTER FOR AN AIR FILTRATION UNIT AND METHOD

(75) Inventors: Steven J. Nowak, Midlothian, VA (US); Robert Haeberle, New Bern, NC (US); John F. Carroll, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

(21) Appl. No.: 11/615,573

(22) Filed: Dec. 22, 2006

(65) Prior Publication Data
US 2008/0148698 A1 Jun. 26, 2008

(51) Int. Cl.
*B01D 46/00* (2006.01)

(52) U.S. Cl. .............. 55/482; 55/484; 55/493; 55/497; 55/521

(58) Field of Classification Search ........... 55/493, 55/495, DIG. 5, DIG. 31, 497, 506, 356, 55/422, 482, 499–502, 521, 483, 484
See application file for complete search history.

(56) References Cited

U.S. PATENT DOCUMENTS

| | | | |
|---|---|---|---|
| RE19,260 E | | 7/1934 | Shurtleff |
| 2,120,258 A | * | 6/1938 | Arlington .............. 206/268 |
| 2,138,874 A | * | 12/1938 | Myers .................. 55/359 |
| 2,980,208 A | | 4/1961 | Neumann |
| 3,057,468 A | * | 10/1962 | Allan, Jr. ............. 206/594 |
| 3,242,562 A | | 3/1966 | Kraft |
| 3,429,434 A | * | 2/1969 | Hickin ................ 206/499 |
| 3,631,582 A | | 1/1972 | Lucas et al. |
| 3,810,350 A | | 5/1974 | Scholl |
| 3,856,491 A | | 12/1974 | Dietrich |
| 3,992,173 A | * | 11/1976 | Wharton et al. .......... 55/501 |
| 4,629,482 A | | 12/1986 | Davis |
| 4,976,677 A | | 12/1990 | Siversson |
| 5,080,699 A | | 1/1992 | Ho et al. |
| 5,330,722 A | | 7/1994 | Pick et al. |
| 5,643,079 A | | 7/1997 | Miyata et al. |

(Continued)

FOREIGN PATENT DOCUMENTS

JP 6-226024 * 8/1994 ............ 55/DIG. 31

(Continued)

*Primary Examiner*—Duane Smith
*Assistant Examiner*—Minh-Chau T. Pham
(74) *Attorney, Agent, or Firm*—Panitch Schwarze Belisario & Nadel LLP

(57) ABSTRACT

A method for packaging, shipping, displaying and positioning a foldable filter having a hinge into an air filtration unit wherein the foldable filter is pivotable about the hinge between a collapsed position and an expanded position. The method includes the steps of positioning the foldable filter in the collapsed position, inserting the collapsed foldable filter into a package, shipping the collapsed foldable filter within the package to a store, positioning the packaged foldable filter for display at the store, removing the foldable filter from the package, moving the foldable filter to the expanded position and positioning the foldable filter into the air filtration unit. The foldable filter includes first and second frame sections connected by the hinge and pleated filter material that includes at least one pleat edge extending generally parallel to a hinge axis. The hinge is formed at least partially by a portion of the at least one pleat edge.

15 Claims, 5 Drawing Sheets

U.S. PATENT DOCUMENTS

| | | | | |
|---|---|---|---|---|
| 5,693,108 | A | * 12/1997 | Roome | ............ 55/493 |
| 5,758,719 | A | 6/1998 | Yoshihashi et al. | |
| 5,931,988 | A | 8/1999 | LeBlanc et al. | |
| 5,997,619 | A | 12/1999 | Knuth et al. | |
| 6,039,777 | A | 3/2000 | Lee | |
| 6,387,164 | B1 * | 5/2002 | Cheng | ............ 96/66 |
| 6,447,566 | B1 * | 9/2002 | Rivera et al. | ............ 55/482 |
| 6,926,781 | B2 | 8/2005 | Duffy | |
| 2004/0148915 | A1 | 8/2004 | Lipner | |
| 2004/0182055 | A1 | 9/2004 | Wynn | |
| 2005/0145224 | A1 | 7/2005 | Zulauf et al. | |

FOREIGN PATENT DOCUMENTS

JP     6-269624    *   9/1994     ............ 55/DIG. 31

* cited by examiner

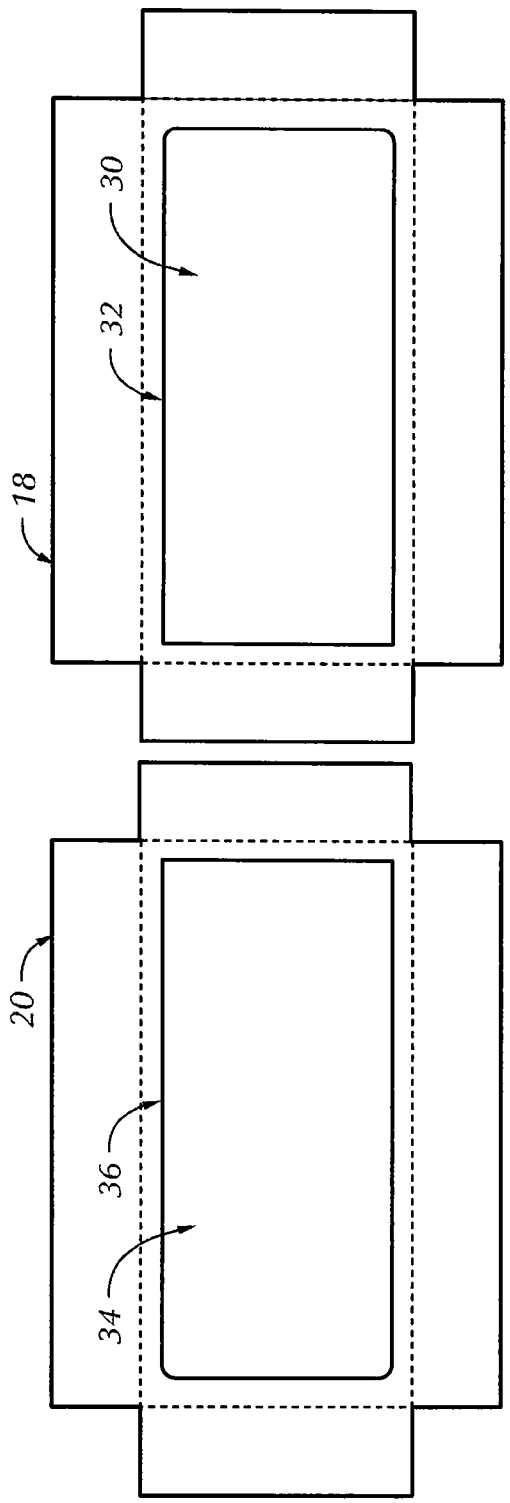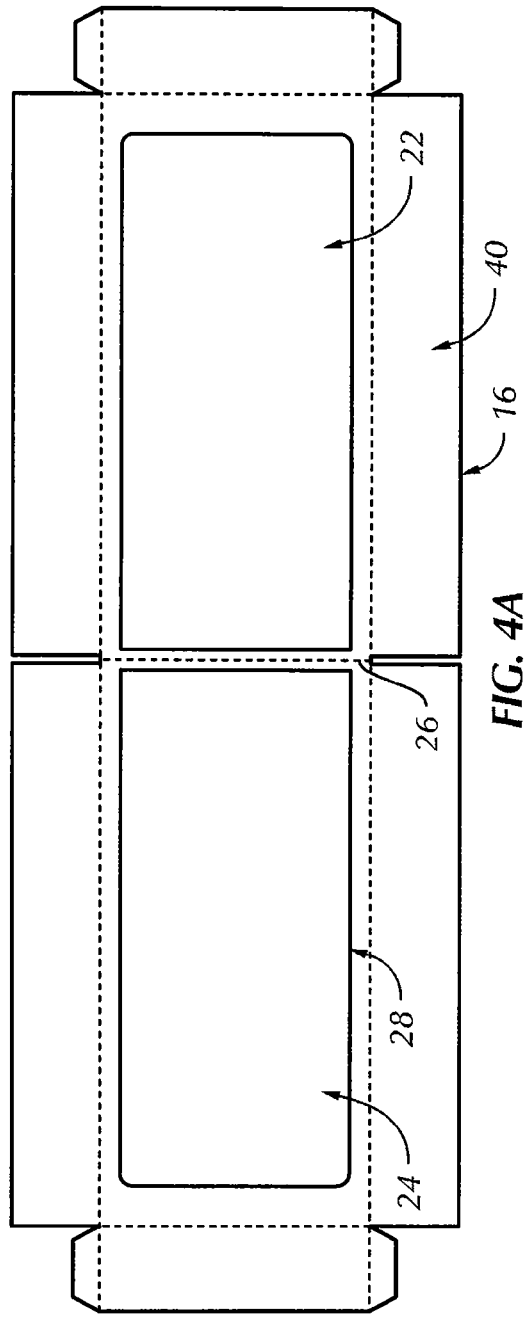
FIG. 4C
FIG. 4B
FIG. 4A

FOLDABLE FILTER FOR AN AIR FILTRATION UNIT AND METHOD

BACKGROUND OF THE INVENTION

The present invention relates generally to air filters, and more particularly, to a foldable filter for an air filtration unit. The present invention also relates to a method for packaging, shipping, displaying, and positioning the foldable filter into an air filtration unit.

Conventional air filters are common in the air purification art for absorbing odors and/or particulate matter. A typical filter is often manufactured for use in a specific air purifier. Certain tower-style air purifiers utilize filters which may be exceptionally long compared to the width and thickness of the filter.

Not surprisingly, this awkward shape does not allow for convenient shipping. A typical package or box dimensions are required to pack the filters for shipping. This is disadvantageous to both the shipper and the carrier. The shape also makes display of the filter in retail stores cumbersome. Valuable shelf space is wasted, and consequently fewer filters or other products are capable of display.

It is therefore desirable to develop an air filter which, while still suited for normal use in an air filtration unit, alleviates the difficulties of shipping and displaying of the prior art filters. It is further desirable to develop a method of shipping, displaying, and positioning such filters in air filtration units.

BRIEF SUMMARY OF THE INVENTION

Briefly stated, the present invention in one embodiment comprises a foldable filter movable between an expanded position for use in an air filtration unit and a collapsed position. The foldable filter includes a frame having a first frame section, a second frame section, and pleated filter material positioned within the frame. A hinge pivotally connects the first frame section to the second frame section along a hinge axis. The pleated filter material includes at least one pleat edge extending generally parallel to the hinge axis. The hinge is formed at least partially by at least a portion of the at least one pleat edge and the frame.

In another embodiment, the present invention comprises a method for packaging, shipping, displaying and positioning a foldable filter having a hinge into an air filtration unit wherein the foldable filter is pivotable about the hinge between a collapsed position and an expanded position. The method includes the steps of positioning the foldable filter in the collapsed position, inserting the collapsed foldable filter into a package, shipping the collapsed foldable filter within the package to a store, positioning the packaged foldable filter onto a display at the store, removing the foldable filter from the package, moving the foldable filter to the expanded position and positioning the foldable filter into the air filtration unit.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 4A-C are top plan views of container blanks of the foldable filter of FIG. 1 that form a frame of the foldable filter.

DETAILED DESCRIPTION OF THE INVENTION

Figure 1:
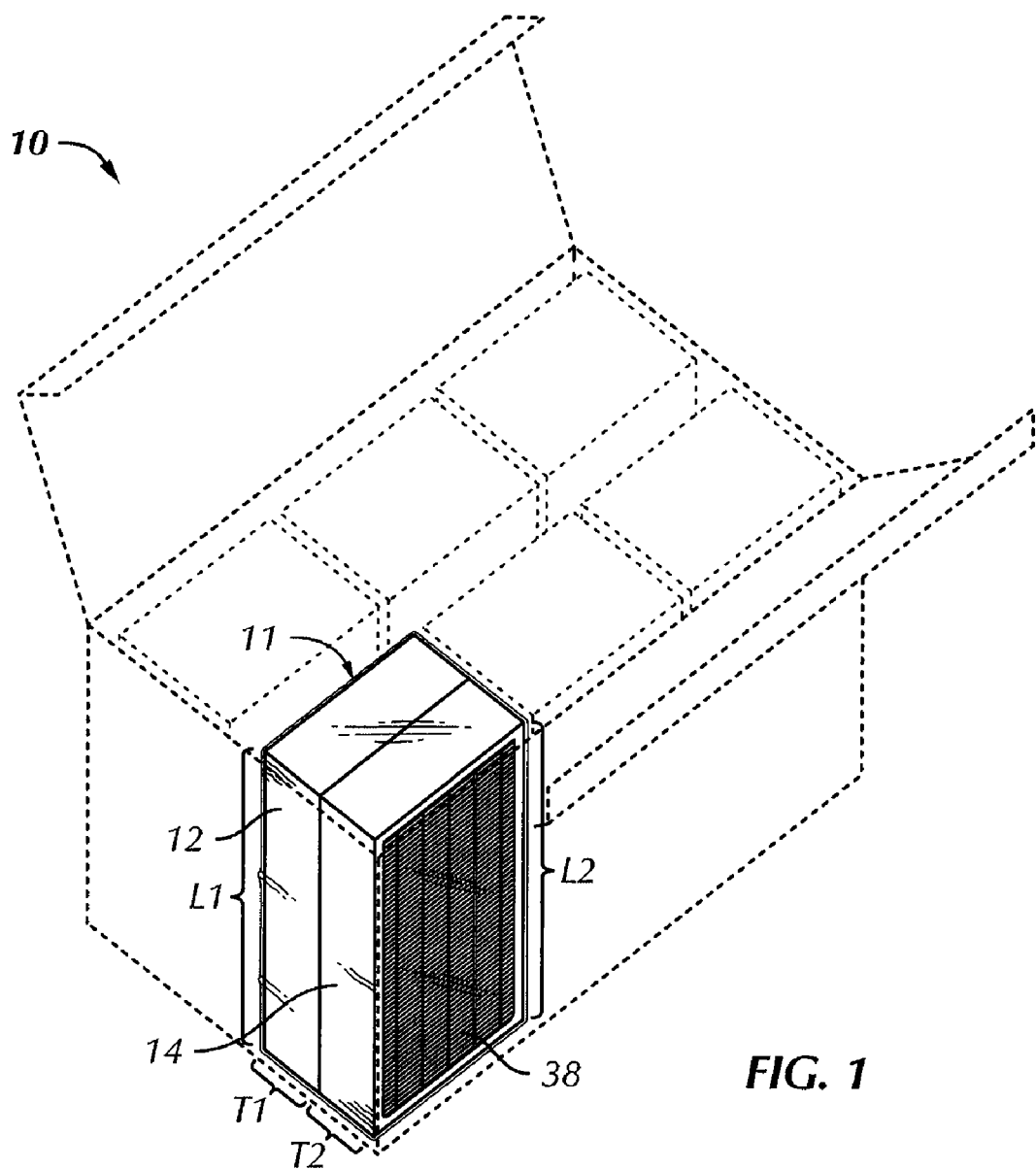
FIG. 1 is a top perspective view of a package for a foldable filter in a collapsed position in accordance with a preferred embodiment of the present invention.

Certain terminology is used in the following description for convenience only and is not limiting. The words "right", "left", "lower" and "upper" designate directions toward and away from, respectively, the geometric center of the foldable filter and designated parts thereof. The terminology includes the above-listed words, derivatives thereof and words of similar import.

Referring to the drawings, wherein the same reference numbers are used to designate the same elements throughout the several figures, there is shown a preferred embodiment of a foldable filter, generally designated 10, in accordance with the present invention. The foldable filter 10 is movable and foldable between an expanded position (FIG. 3) for use in an air filtration unit (not shown) and a collapsed position (FIGS. 1, 5) for storage and shipping. The foldable filter 10 has a frame, generally designated 11, which includes a first frame section, generally designated 12, and a second frame section, generally designated 14.

Figure 3:
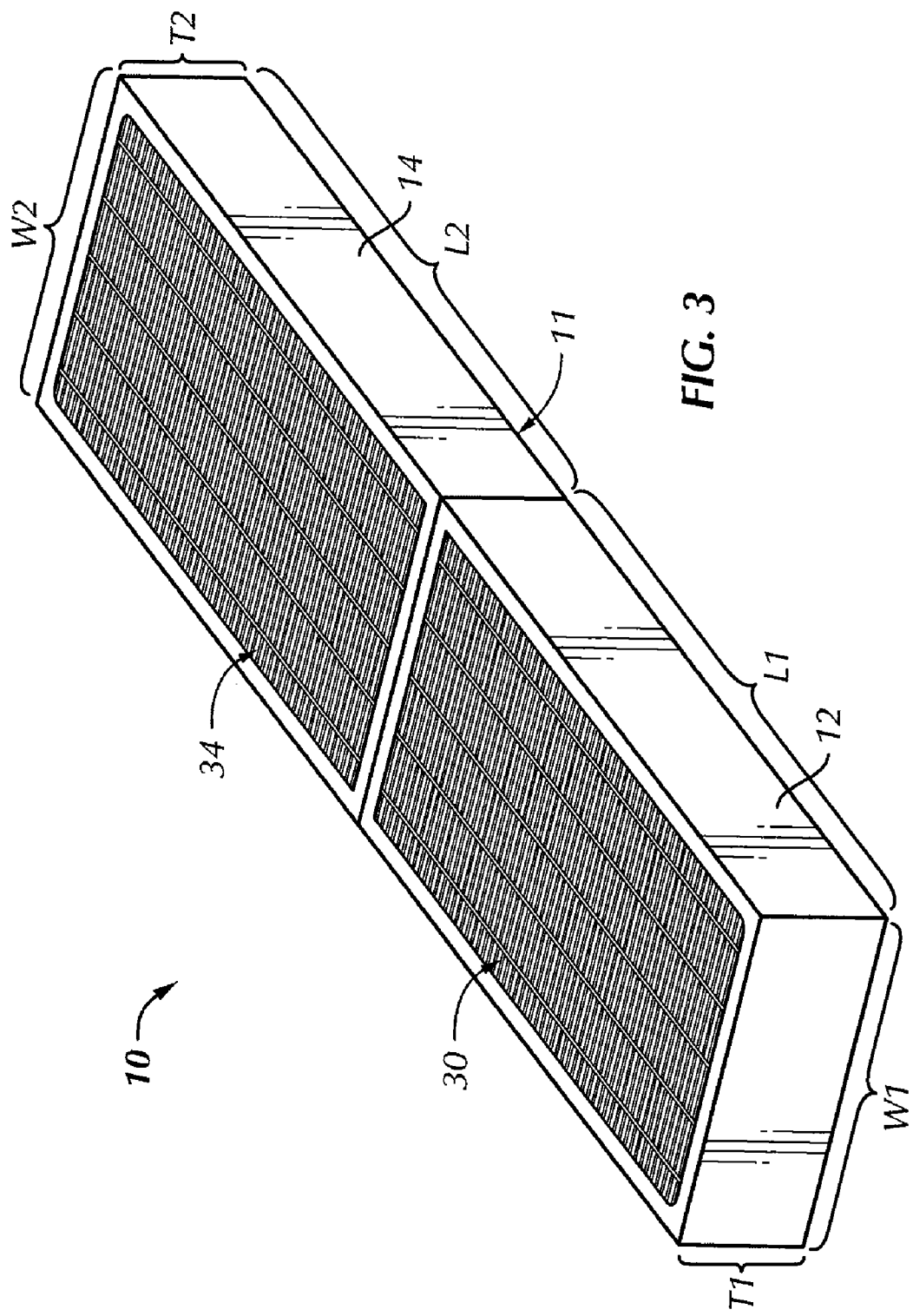
FIG. 3 is a top perspective view of the foldable filter shown in FIG. 1 in an expanded position.

Referring to FIG. 3, the foldable filter 10 has a width defined by one of a first width, W1, of the first frame section 12 and a second width, W2, of the second frame section 14. In the preferred embodiment, widths W1 and W2 are generally equal, but need not be equal. The foldable filter 10 also has an expanded overall length defined by a sum of a first length, L1, of the first frame section 12 and a second length, L2, of the second frame section 14. In the preferred embodiment, lengths L1 and L2 are generally equal, but need not be equal. The foldable filter 10 additionally has an expanded thickness defined by one of a first thickness, T1, of the first frame section 12 and a second thickness, T2, of the second frame section 14. In the preferred embodiment, the thicknesses T1 and T2 are generally equal, but need not be equal. Referring to FIG. 1, the foldable filter 10 in a collapsed position has a collapsed length defined by one of the first length, L1, and the second length, L2. The foldable filter 10 also has a collapsed thickness defined by a sum of the first thickness, T1, and the second thickness T2. The collapsed width of the foldable filter 10 is defined by one of the first width, W1 and the second width, W2.

In preferred embodiments, the frame 11 is constructed from paperboard or cardboard. However, the frame 11 could be constructed from other materials such as a polymeric material. In the preferred embodiment, the first width, W1, is preferably 5.3 inches. The first length, L1, is preferably 11.5 inches if the foldable filter 10 is folded on its center. The first thickness, T1, is preferably 1.75 inches. In preferred embodiments, the dimensions of the first frame section 12 and the second frame section 14 are equivalent. The present invention is not limited to the above specified dimensions.

Referring to FIGS. 4A, 4B, and 4C, in preferred embodiments of the present invention, the frame 11 is constructed from a first container blank 16 (FIG. 4A), a second container blank 18 (FIG. 4C), and a third container blank 20 (FIG. 4B). The container blanks 16, 18, and 20 include windows as will be described in detail shortly. The first blank 16 forms portions of a first side of the first frame section 12 and second frame section 14. The first blank 16 has a first window 22 and a second window 24. First and second windows 22 and 24 are defined by a central rib 26 and a peripheral border 28 of the first blank 16.

The second blank 18 forms a portion of a second side of the first frame section 12. The second blank 18 includes a third window 30 defined by a peripheral border 32. The third blank 20 forms a portion of a second side of the second frame section 14. The third blank 20 includes a fourth window 34 defined by a peripheral border 36. Dotted lines on the three blanks 16, 18, and 20 are shown on FIGS. 4A, 4B, and 4C to give a general indication of where the blanks 16, 18, 20 are folded for assembly of the frame 11.

In assembling the frame 11, the edge flaps of the first blank 16 are folded upwardly along the dotted lines shown on the blank 16 in FIG. 4A. A filter material is placed on the folded blank 16 and is confined by the folded flaps of blank 16 and peripheral border 28. The filter material may be adhered to the first blank 16 if desired. The second blank 18 is similarly folded downwardly along the dotted lines shown on the blank 18 in FIG. 4C. The second blank 18 is paired with the portion of first container blank 16 having window 22 with the flaps engaged. The second blank 18 is positioned such that the filter material is confined by the peripheral border 32 and the folded flaps of blank 18. The second blank 18 may be adhered to at least one of the filter material and the folded flaps of the first blank 16 if desired.

The third blank 20 is folded and attached in the same way as the second blank 18. It will be appreciated by those skilled in the art that the frame 11 may be assembled in a manner departing from the manner described above. Therefore, assembly of the frame 11 is not limited to the disclosed method. It is intended only as a way of illustrating how the blanks 16, 18, and 20 may be folded and assembled to form the frame 11.

FIG. 3 shows the foldable filter 10 in an expanded position. The foldable filter 10 has a filter plane (not shown in FIG. 3) and when in this expanded position, the first window 22 (not visible in FIG. 3) and the second window 24 (not visible in FIG. 3) are generally positioned on the filter plane. The third window 30 and the fourth window 34 are also generally positioned on the filter plane. An airflow direction (not shown in FIG. 3) is generally perpendicular to the filter plane. In the expanded position, the first window 22 is aligned with the third window 30 and the second window 24 is aligned with the fourth window 34 in the airflow direction. When in the expanded position, the foldable filter 10 is capable of being inserted into an air filtration unit (not shown).

A first central axis (not shown in FIG. 3) is associated with the first window 22 and the third window 30. Similarly, a second central axis (not shown in FIG. 3) is associated with the second window 24 and the fourth window 34. When the foldable filter 10 is in the collapsed position, as shown in FIG. 1, the first and second central axes are coaxial with one another.

The foldable filter 10 also includes pleated filter material 38 positioned within the frame 11. Referring to FIG. 4, in preferred embodiments, at least the first container blank 16 has an internal surface 40 and an exposed surface 42 (visible in FIG. 2). When the foldable filter 10 is in an assembled configuration, the internal surface 40 is in at least a partial facing engagement with the pleated filter material 38. When the foldable filter 10 is in the collapsed position, as shown in FIG. 1, at least a portion of the exposed surface 42 of the first frame section 12 is in facing engagement with at least a portion of the exposed surface 42 of the second frame section 14.

Figure 2:
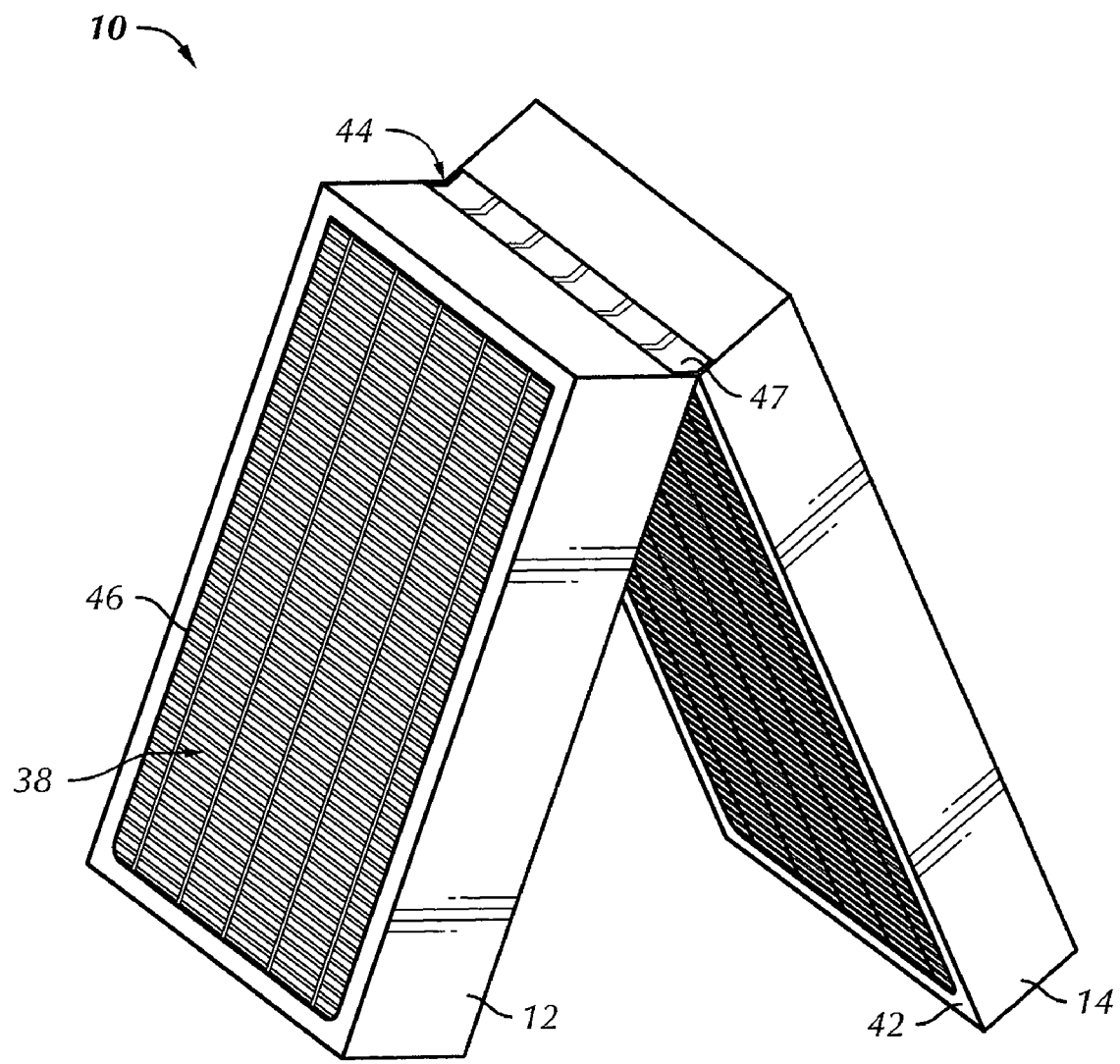
FIG. 2 is a top perspective view of the foldable filter shown in FIG. 1 in an intermediate position.

In FIG. 2, the foldable filter 10 is shown in an intermediate partially collapsed position. A hinge 44 pivotally connects the first frame section 12 to the second frame section 14 along a hinge axis (not shown in FIG. 2). The pleated filter material 38 includes at least one pleat edge 46 which extends generally parallel to the hinge axis. The hinge 44 is formed at least partially by a portion of the at least one pleat edge 46. In preferred embodiments, the hinge is formed by the hinge pleat edge 47 and the central rib 26 of the first container blank 16.

Embodiments of the present invention are also directed to a method for packaging, shipping, displaying, and positioning the above-described foldable filter having a hinge into an air filtration unit. Providing a foldable filter pivotable about the hinge allows for more convenient shipping and storage when the filter is in a collapsed position, while still allowing use in the air filtration unit when the filter is in its expanded position.

Figure 5:
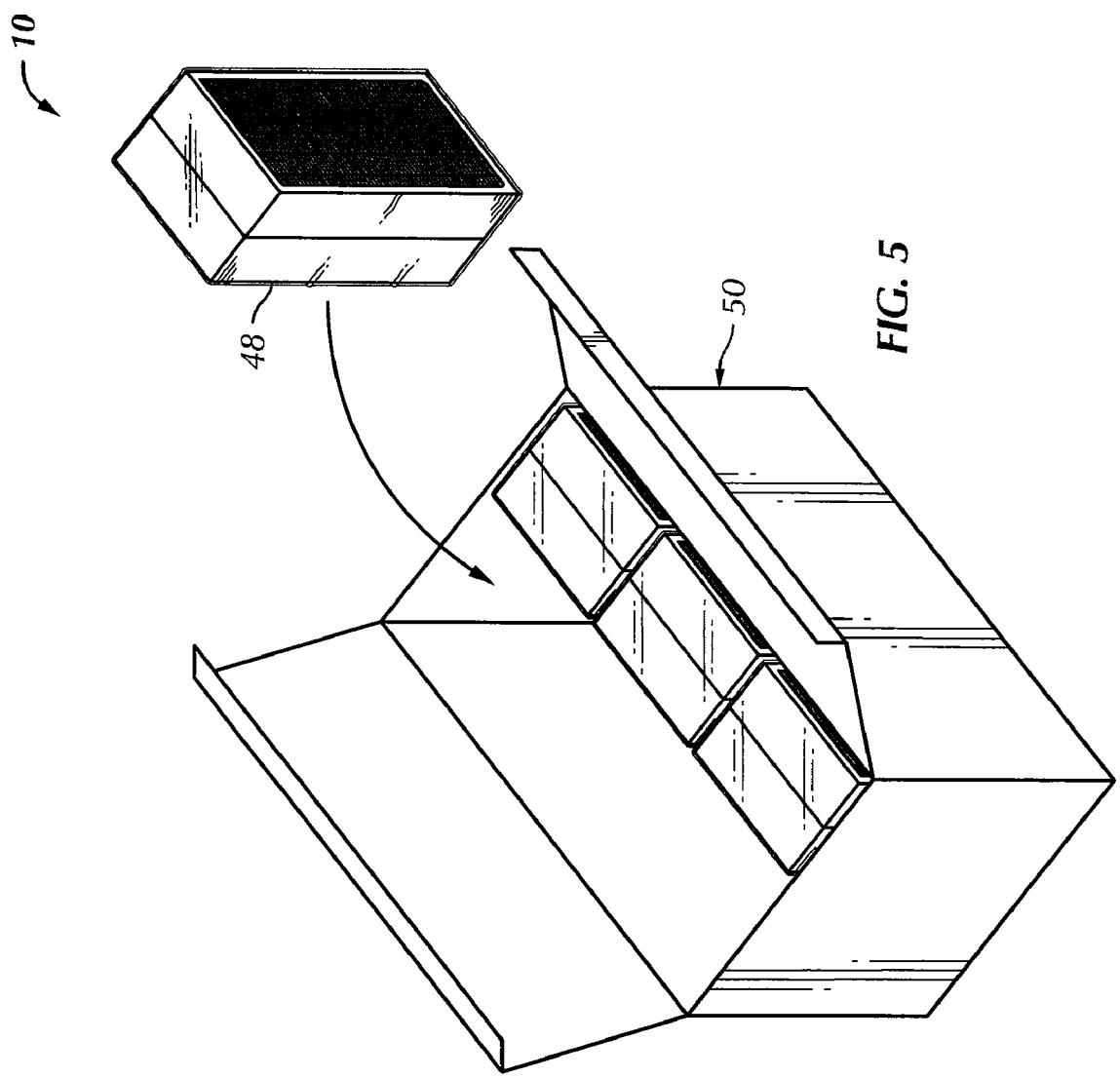
FIG. 5 is a top perspective view of the foldable filter shown in FIG. 1 positioned in a package and being inserted into a shipping container.

Referring to FIG. 5, the foldable filter 10 is positioned in the collapsed position. The collapsed foldable filter 10 is then inserted into a package 48, for example, shrink wrap. In preferred embodiments, the foldable filter 10 is then placed into a shipping container 50. Providing the foldable filter 10 in this manner allows the use of a more typical shipping container 50.

The foldable filter 10 is then shipped within its package 48 to a retail or other store. In preferred embodiments, the packaged foldable filter 10 is removed from the shipping container 50 following receipt. The packaged foldable filter 10 is next positioned onto a shelf or other display at the store. In preferred embodiments, the packaged foldable filter 10 is sold to a consumer.

The foldable filter 10 may be removed from the package 48. The foldable filter 10 may then be moved to the expanded position, as shown in FIG. 3. The foldable filter 10 is then positioned into the air filtration unit.

Although the foldable filter has been described above as being foldable about one centrally positioned hinge and forming two frame sections, the present invention is not so limited. Those skilled in the art will understand that the present invention may include filters foldable about two or more variously positioned hinges forming three or more frame sections. For example, the foldable filter 10 may be configured with a plurality of hinges and adapted for mounting in an air purification system or air filtration unit similar to the unit disclosed in U.S. Pat. No. 5,997,619 ('619 patent), such that the filter has a generally cylindrical shape in a mounted or working position. Similarly, the foldable filter 10 is not limited to use in an air filtration unit solely when in the fully expanded position. The filter 10 may be capable of use in air filtration units while in a partially expanded position or a position where butt ends of the frame sections of the filter separated by the hinges are not in facing engagement with each other. For example, a pair of the preferred foldable filters 10 of the present application may mount into the air filtration unit described in the '619 patent with the frame sections 12, 14 positioned at right angles relative to each other at the hinges 44 such that each frame section 12, 14 is associated with one of the air inlets of the generally square housing of the air filtration unit described in the '619 patent. In such an exemplary configuration, each of the separate adjacent frame sections 12, 14 would be positioned at generally right angles relative to each other.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A foldable filter movable between an expanded position for use in an air filtration unit and a collapsed position, the foldable filter comprising:
    a frame including a first frame section and a second frame section;
    pleated filter material positioned within the frame; and
    a hinge pivotally connecting the first frame section to the second frame section along a hinge axis, the pleated filter material including at least one pleat edge extending generally parallel to the hinge axis, the hinge being formed at least partially by at least a portion of the at least one pleat edge and the frame.

2. The foldable filter of claim 1 wherein the frame is constructed of a first container blank, a second container blank and a third container blank, the first, second and third container blanks including windows therein.

3. The foldable filter of claim 1 wherein the frame includes at least a first container blank having an exposed surface and an internal surface, the internal surface being in at least partial facing engagement with at least a portion of the pleated filter material in an assembled configuration.

4. The foldable filter of claim 3 wherein at least a portion of the exposed surface of the first frame section is in facing engagement with at least a portion of the exposed surface of the second frame section in the collapsed position.

5. The foldable filter of claim 1 wherein the frame comprises a first blank, a second blank and a third blank, the first blank forming portions of the first and second frame sections, the second blank forming a portion of the first frame section and the third blank forming a portion of the second frame section.

6. The foldable filter of claim 5 wherein the first blank includes first and second windows defined by a central rib and a peripheral border of the first blank.

7. The foldable filter of claim 6 wherein the hinge comprises the central rib and the hinge pleat edge.

8. The foldable filter of claim 6 wherein the second blank includes a third window defined by a peripheral border and the third blank includes a fourth window defined by a peripheral border.

9. The foldable filter of claim 8 wherein the foldable filter includes a filter plane, the first and second windows positioned generally on the filter plane when the foldable filter is in the expanded position, an air flow direction being generally perpendicular to the filter plane, the first window being aligned with the third window and the second window being aligned with the fourth window in the air flow direction when the foldable filter is in the expanded position.

10. The foldable filter of claim 9 further including a first central axis associated with the first and third windows and a second central axis associated with the second and fourth windows, the first and second central axes being coaxial when the foldable filter is in the collapsed position.

11. The foldable filter of claim 1 further comprising:
    a width defined by one of a first width of the first frame section and a second width of the second frame section;
    an expanded length defined by a sum of a first length of the first frame section and a second length of the second frame section;
    a collapsed length defined by one of the first length and the second length;
    an expanded thickness defined by one of a first thickness of the first frame section and a second thickness of the second frame section; and
    a collapsed thickness defined by a sum of the first thickness and the second thickness.

12. A method for shipping, displaying and positioning a foldable filter having a first frame section with a first central axis, a second frame section with a second central axis, and a hinge into an air filtration unit, the foldable filter having a filter plane and an air flow direction generally perpendicular to the filter plane and generally coaxial with the first frame axis and the second frame axis, the foldable filter being pivotable about the hinge between a collapsed position and an expanded position, the first frame section and the second frame section being positioned generally coplanar with the filter plane when the foldable filter is in the expanded position, the first central axis and the second central axis being generally coaxial when the foldable filter is in the collapsed position, the method comprising the steps of:
    a) positioning the foldable filter in the collapsed position;
    b) inserting the collapsed foldable filter into a package;
    c) shipping the collapsed foldable filter within the package to a store;
    d) positioning the packaged foldable filter onto a display at the store;
    e) removing the foldable filter from the package;
    f) moving the foldable filter to the expanded position; and
    g) positioning the foldable filter into the air filtration unit.

13. The method of claim 12 comprising the further step of:
    h) positioning the packaged foldable filter into a shipping container prior to step (c).

14. The method of claim 13 comprising the further step of:
    i) removing the packaged foldable filter from the shipping container following step (c).

15. The method of claim 12 comprising the further steps of:
    j) selling the foldable filter to a consumer prior to step (e).

* * * * *